(12) United States Patent
Pang et al.

(10) Patent No.: US 12,227,169 B2
(45) Date of Patent: Feb. 18, 2025

(54) METHOD AND APPARATUS FOR DETECTING PARKING SPACE AND DIRECTION AND ANGLE THEREOF, DEVICE AND MEDIUM

(71) Applicant: NEUSOFT REACH AUTOMOTIVE TECHNOLOGY (SHENYANG) COMPANY, Shenfu New District (CN)

(72) Inventors: Fei Pang, Shenfu New District (CN); Jin Lv, Shenfu New District (CN); Ting Zhou, Shenfu New District (CN)

(73) Assignee: NEUSOFT REACH AUTOMOTIVE TECHNOLOGY (SHENYANG) COMPANY, Shenfu New District (CN)

( * ) Notice: Subject to any disclaimer, the term of this patent is extended or adjusted under 35 U.S.C. 154(b) by 0 days.

(21) Appl. No.: 17/767,919

(22) PCT Filed: Jul. 17, 2020

(86) PCT No.: PCT/CN2020/102517
§ 371 (c)(1),
(2) Date: Apr. 11, 2022

(87) PCT Pub. No.: WO2021/068588
PCT Pub. Date: Apr. 15, 2021

(65) Prior Publication Data
US 2024/0092344 A1    Mar. 21, 2024

(30) Foreign Application Priority Data

Oct. 12, 2019 (CN) .......................... 201910969470.1

(51) Int. Cl.
*B60W 30/06* (2006.01)
*G06T 7/73* (2017.01)
(Continued)

(52) U.S. Cl.
CPC ............... *B60W 30/06* (2013.01); *G06T 7/73* (2017.01); *G06V 10/44* (2022.01); *G06V 10/764* (2022.01);
(Continued)

(58) Field of Classification Search
CPC ............. B60W 30/06; B60W 2552/53; B60W 2420/403; G06T 7/73; G06T 2207/20081;
(Continued)

(56) References Cited

U.S. PATENT DOCUMENTS 8,319,663 B2 * 11/2012 Von Reyher ........... G08G 1/165
180/199
9,483,943 B2 * 11/2016 Lee .......................... G08G 1/14
(Continued)

FOREIGN PATENT DOCUMENTS

| CN | 106945660 A | 7/2017 |
| CN | 107527017 A | 12/2017 |

(Continued)

OTHER PUBLICATIONS

Japanese Patent Office, first office action Issued in Application No. 2022-521761, Jun. 6, 2023, 5 pages.
(Continued)

*Primary Examiner* — Andrew Joseph Rudy
(74) *Attorney, Agent, or Firm* — Kilpatrick Townsend & Stockton LLP (57) ABSTRACT

A method and an apparatus for detecting a parking place and a direction angle of the parking place, a device, a vehicle, and a computer readable storage medium are provided. The method includes: obtaining a to-be-detected image; identifying corner points of a parking space in the to-be-detected image and cropping the to-be-detected image based on the corner points of the parking space to obtain a candidate parking space image; and performing detection by using a
(Continued)

pre-trained parking space detection model based on the candidate parking space image to obtain a parking space detection result, where the parking space detection result indicates whether the candidate parking space image represents a real parking space, and in a case that the candidate parking space image represents the real parking space, the parking space detection result further includes a direction angle of the parking space.

11 Claims, 4 Drawing Sheets

(51) Int. Cl.
    *G06V 10/44*     (2022.01)
    *G06V 10/764*     (2022.01)
    *G06V 20/58*     (2022.01)
    *G08G 1/14*     (2006.01)

(52) U.S. Cl.
    CPC ........... *G06V 20/586* (2022.01); *G08G 1/145* (2013.01); *B60W 2420/403* (2013.01); *B60W 2552/53* (2020.02); *G06T 2207/20081* (2013.01); *G06T 2207/30264* (2013.01)

(58) Field of Classification Search
    CPC .......... G06T 2207/30264; G06V 10/44; G06V 10/764; G08G 1/145
    USPC ......................................................... 701/117
    See application file for complete search history.

(56) References Cited

U.S. PATENT DOCUMENTS

| | | | | |
|---|---|---|---|---|
| 11,455,805 | B2* | 9/2022 | Lu | G06T 7/70 |
| 11,698,459 | B2* | 7/2023 | Chi | G06V 10/25 |
| | | | | 382/104 |
| 11,904,843 | B2* | 2/2024 | Suddamalla | G06V 20/588 |
| 2010/0231416 | A1 | 9/2010 | Wu et al. | |
| 2011/0074604 | A1 | 3/2011 | Hsu et al. | |
| 2016/0093214 | A1 | 3/2016 | Wu et al. | |
| 2019/0228658 | A1 | 7/2019 | Huang et al. | |
| 2024/0092344 | A1* | 3/2024 | Pang | G06V 20/586 |

FOREIGN PATENT DOCUMENTS

| | | | |
|---|---|---|---|
| CN | 107886080 | A | 4/2018 |
| CN | 108875911 | A * | 11/2018 |
| CN | 109583392 | A | 4/2019 |
| CN | 109614913 | A | 4/2019 |
| CN | 109740584 | A | 5/2019 |
| CN | 109918977 | A | 6/2019 |
| CN | 110322680 | A | 10/2019 |
| CN | 110706509 | A | 1/2020 |
| JP | H06274796 | A | 9/1994 |
| JP | 2013216305 | A | 10/2013 |

OTHER PUBLICATIONS

Andrea Zinelli et al., "A Deep-Learning Approach for Parking Slot Detection on Surround-View Images", 2019 IEEE Intelligent Vehicles Symposium (IV), Paris, France. Jun. 9-12, 2019, total 6 pages.

Junhao Huang et al., "DMPR-PS: a Novel Approach for Parking-Slot Detection Using Directional Marking-Point Regression", 2019 IEEE International Conference on Multimedia and Expo (ICME), Jul. 8, 2019, total 6 pages.

Lin Zhang et al.,"Vision-Based Parking-Slot Detection: A DCNN-Based Approach and a Large-Scale Benchmark Dataset", IEEE Transactions on Image Processing, vol. 27, No. 11, Nov. 2018, total 15 pages.

Suhr Jae Kyu et al: "Sensor Fusion-Based Vacant Parking Slot Detection and Tracking", IEEE Transactions on Intelligent Transportation Systems, IEEE, Piscataway, NJ, USA, vol. 15, No. 1, Feb. 2014, total 16 pages.

European Patent Office, Extended European Search Report Issued in Application No. 20874660.2, Oct. 5, 2023, Germany, 9 pages.

* cited by examiner

Input an image → Multi-task-based network for detecting a parking place and a direction angle thereof → A detection result for the parking place and the detection angle of the parking place

Figure 8 img# METHOD AND APPARATUS FOR DETECTING PARKING SPACE AND DIRECTION AND ANGLE THEREOF, DEVICE AND MEDIUM The present application is the national phase of International Patent Application No. PCT/CN2020/102517, titled "METHOD AND APPARATUS FOR DETECTING PARKING SPACE AND DIRECTION ANGLE THEREOF, DEVICE AND MEDIUM", filed on Jul. 17, 2020, which claims priority to Chinese Patent Application No. 201910969470.1, titled "METHOD AND APPARATUS FOR DETECTING PARKING SPACE AND DIRECTION ANGLE THEREOF, DEVICE AND MEDIUM", filed on Oct. 12, 2019 with the Chinese Patent Office, both of which are incorporated herein by reference in their entireties.

FIELD

The present disclosure relates to the field of computers, and in particular to a method and an apparatus for detecting a parking place and a direction angle of the parking place, a device, a vehicle, and a computer readable storage medium.

BACKGROUND

In an automatic parking system, parking space detection is very important for subsequent functions such as vehicle path planning, tracking, and accurate parking. The parking space detection is very important in the automatic parking system.

The conventional methods for detecting a parking space mainly include: a method based on a user interface, a method based on infrastructures, a method based on a free space, and a method based on a parking space mark. With the method based on a parking space mark, a parking space is detected based on the parking space mark rather than adjacent vehicles, to accurately detect a parking space.

At present, in the method based on a parking space mark, corner points of a parking space are detected, and then the type of the parking space and an angle of the parking space are determined. The tasks, after detecting the corner points, are processed with multiple methods or through multiple cascaded networks, resulting in large performance loss in an in-vehicle embedded environment and low availability.

SUMMARY

A method for detecting a parking place and a direction angle of the parking place is provided according to the present disclosure. With the method, two tasks of detecting a parking space and detecting a direction angle of the parking space are fused into one network for joint training to obtain a parking detection model. Detection is performed by using the model based on a to-be-detected image to determine whether a candidate parking space image represents a real parking space and determine a direction angle of the real parking space, to reduce performance loss and achieving high availability. An apparatus for detecting a parking place and a direction angle of the parking place, a device, a vehicle, a computer readable storage medium and a computer program product are further provided according to the present disclosure.

According to a first aspect of the present disclosure, a method for detecting a parking place and a direction angle of the parking place is provided. The method includes: obtaining a to-be-detected image; identifying corner points of a parking space in the to-be-detected image and cropping the to-be-detected image based on the corner points of the parking space to obtain a candidate parking space image; and performing detection by using a pre-trained parking space detection model based on the candidate parking space image to obtain a parking space detection result, where the parking space detection result indicates whether the candidate parking space image represents a real parking space, and in a case that the candidate parking space image represents the real parking space, the parking space detection result further includes a direction angle of the parking space.

According to a second aspect of the present disclosure, an apparatus for detecting a parking place and a direction angle of the parking place is provided. The apparatus includes an obtaining device, an identification device and a detection device. The obtaining device is configured to obtain a to-be-detected image. The identification device is configured to identify corner points of a parking space in the to-be-detected image and crop the to-be-detected image based on the corner points of the parking space to obtain a candidate parking space. The detection device is configured to perform detection by using a pre-trained parking space detection model based on the candidate parking space image to obtain a parking space detection result. The parking space detection result indicates whether the candidate parking space image represents a real parking space. In a case that the candidate parking space image represents the real parking space, the parking space detection result further includes a direction angle of the parking space.

According to a third aspect of the present disclosure, a device is provided. The device includes a processor and a memory. The memory stores a computer program. The processor is configured to perform, when executing the computer program stored in the memory, the method for detecting a parking place and a direction angle of the parking place according to the first aspect.

According to a fourth aspect of the present disclosure, a vehicle is provided. The vehicle includes a parking system and a controller. The parking system is configured to perform the method for detecting a parking place and a direction angle of the parking place according to the first aspect to determine an available parking space. The available parking space is determined based on a candidate parking space image which represents a real parking space based on a parking space detection result. The controller is configured to control the vehicle to park based on the available parking space.

According to a fifth aspect of the present disclosure, a computer readable storage medium is provided. The computer readable storage medium stores a computer program. The computer program, when executed by a processor, causes the processor to perform the method for detecting a parking place and a direction angle of the parking place according to the first aspect.

According to a sixth aspect of the present disclosure, a computer program product is provided. The computer program product, when executed on a data processing device, is applicable to initialize a program to perform the method for detecting a parking place and a direction angle of the parking place according to the first aspect.

It can be seen from the above embodiments of the present disclosure have the following aspects.

A model-based method for detecting a parking place and a direction angle of the parking place is provided according to the embodiments of the present disclosure. With the method, two tasks of detecting a parking space and detecting a direction angle of the parking space are fused into one network model for joint training to obtain a parking detection model. A to-be-detected image is obtained. Corner points of a parking place in the to-be detected image are identified. The to-be-detected image is cropped based on the corner points of the parking space to obtain a candidate parking space image. The candidate parking space image is inputted to the parking space detection model for detection. The parking space detection model simultaneously predicts the type of the parking space and the direction angle of the parking space, and obtains a parking space detection result. The parking space detection result indicates whether the candidate parking space image represents a real parking space. In a case that the candidate parking space image represents the real parking space, the direction angle of the parking space is outputted. Therefore, the performance loss caused by use of two cascaded networks respectively for detecting the type of the parking space and detecting the direction angle of the parking space is avoided, and high availability is achieved.

BRIEF DESCRIPTION OF THE DRAWINGS

In order to clearly describe the embodiments of the present disclosure, drawings to be used in the description of the embodiments of the present disclosure or the conventional technology are briefly described hereinafter. It is apparent that the drawings described below are merely used for describing the embodiments of the present disclosure.

DETAILED DESCRIPTION OF EMBODIMENTS

In order to understand the embodiments of the present disclosure are clearly and completely described below in conjunction with the drawings of the embodiments of the present disclosure. Apparently, the embodiments described below are only some embodiments of the present disclosure, rather than all the embodiments.

In the specification, the claims and the drawings of the present disclosure, terms such as "first", "second", "third", "fourth" and the like (if exists) are merely for distinguishing similar objects rather than describing a specific order or sequence. It should be understood that the terms so used may be interchangeable in appropriate cases, and the embodiments according to the present disclosure described herein may be implemented, for example, in an order other than those illustrated or described herein. In addition, terms of "include", "comprise" or any other variants are intended to be non-exclusive. For example, a process, method, system, product or device including a series of steps or units includes not only the enumerated steps or units but also other steps or units that are not enumerated, or also include steps or units inherent in the process, method, product or device.

In the conventional methods for detecting a parking space, multiple tasks, after corner detection, are processed by using multiple methods or multiple cascaded networks, resulting in large performance loss in an in-vehicle embedded environment and low availability. In order to solve the above problems, a method for detecting a parking place and a direction angle of the parking place is provided according to the present disclosure. With the method, tasks of determining a parking space and determining a direction angle of the parking space are fused into one network model for training. A candidate parking space image obtained by cropping a to-be-detected image based on corner points in the to-be-detected image is inputted to the model to detect the type of the parking space and the direction angle of the parking space simultaneously, to solve the problem of large performance loss caused by cascaded networks in an in-vehicle embedded environment.

Hereinafter, the embodiments of the present disclosure are introduced from the perspective of model training and model application. A model training method may be applied to a processing device having image processing capability. The processing device may be a device having a central processing unit/processor (CPU) and/or a graphics processing unit (GPU). The processing device may be a terminal. The terminal includes but is not limited to a personal computer (PC) and a workstation. Apparently, the processing device may be a server. The processing device may be independent or in a cluster form. The model-based method for detecting a parking place and a direction angle of the parking place is mainly applied to a parking system of a vehicle.

The model training method may be stored in the processing device in a form of a computer program. The processing device, when executing the computer program, performs model training. The model-based method for detecting a parking place and a direction angle of the parking place may be stored in the parking system of the vehicle in a form of a computer program. The parking system, when executing the computer program, performs parking space detection. The computer program may be independent. Alternatively, the computer program may be a functional device, a plug-in or an applet that are integrated on other programs.

Figure 1:
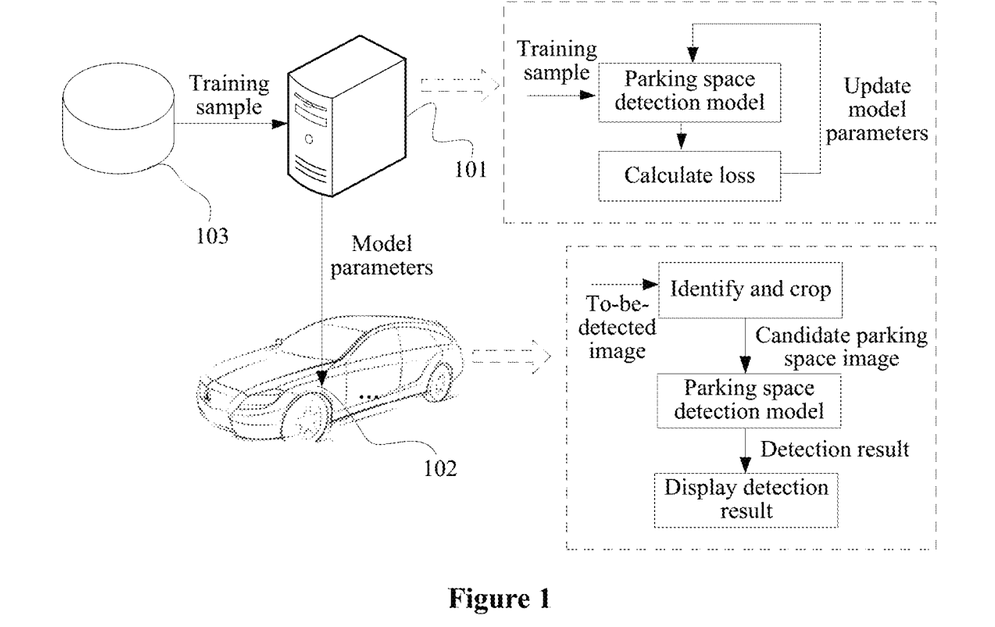
FIG. 1 is an architecture diagram of a system for performing a model training method and a method for detecting a parking place and a direction angle of the parking place according to an embodiment of the present disclosure.

It can be understood that the model training method and the method for detecting a parking place and a direction angle of the parking place according to the present disclosure are applied to, but not limited to, the application environment shown in FIG. 1.

As shown in FIG. 1, a server 101 and a parking system 102 of a vehicle are connected via a network such as a wireless communication network. The server 101 is connected to a sample database 103, and the server 101 may obtain a training sample from the sample data 103. The training sample includes a parking space sample image and labeling information of the parking space sample image. The labeling information includes a parking space position and a parking space label. The parking space label indicates whether the parking space sample image represents a real parking space and a direction angle of the real parking space.

The server 101 trains a parking space detection model based on the training sample. For the parking space detection model, a candidate parking space image is used as an input, and a parking space detection result is outputted. The parking space detection result indicates whether the candidate parking space image represents a real parking space and a direction angle of the real parking space. In this way, after the server 101 inputs a training sample to the parking space detection model, the parking space detection model performs feature extraction on the parking space sample image in the training sample, performs parking space detection based on an extracted image feature, compares a parking space detection result with a parking space label corresponding to the parking space sample image in the training sample, calculates a loss function of the parking space detection model based on a comparison result, and updates parameters of the parking space detection model based on the loss function. In a case that the loss function of the parking space detection model meets a training end condition, for example, the loss function is in a convergent state or less than a preset threshold, the server 101 stops training, and the currently trained parking space detection model is used for detecting a parking space and a direction angle of the parking space.

After training the parking space detection model, the server 101 transmits model parameters of the parking space detection model to the parking system 102 of the vehicle, and the parking system 102 may detect a parking space by using the parking space detection model. The parking system 102 obtains a to-be-detected image based on an image obtained by the parking system 102 capturing a parking space, identifies corner points of a parking space in the to-be-detected image, crops the to-be-detected image based on the corner points of the parking space to obtain a candidate parking space image, and perform detection by using the parking space detection model based on the candidate parking space image to obtain a parking space detection result. In a case that the parking space detection result indicates that the candidate parking space image represents a real parking space, the parking space detection result further includes a direction angle of the real parking space. Then, the parking system 102 may display the parking space detection result on a display panel.

Next, the model training method and the method for detecting a parking place and a direction angle of the parking place according to the present disclosure are introduced from the perspective of the server and the parking system of the vehicle.

Figure 2:
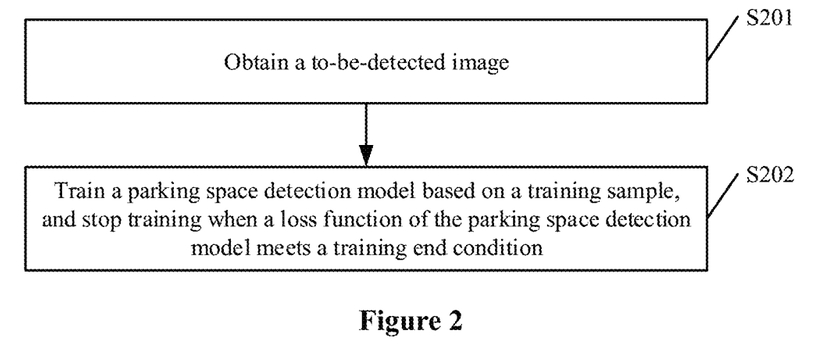
FIG. 2 is a flowchart of a model training method according to an embodiment of the present disclosure.

Referring to a flowchart of a model training method shown in FIG. 2, the method includes the following steps S201 and S202.

In step S201, a training sample is obtained.

The training sample includes a parking space sample image and labeling information of the parking space sample image. The labeling information includes a parking space position and a parking space label corresponding to the parking space sample image. The parking space label indicates whether the parking space sample image represents a real parking space and a direction angle of the real parking space. That is, for a positive sample, the parking space label indicates that the parking space sample image represents a real parking space and identifies a direction angle of the real parking space; for a negative sample, the parking space label indicates that the parking space sample image represents a non-real parking space.

The parking space sample image is extracted from a stitched look-around image and identifies a candidate parking space. The stitched look-around image is obtained by stitching images of a parking space captured by multiple cameras (for example, four cameras) including a front camera and a rear camera of a vehicle. For the stitched look-around image, corner points of the parking space shown in the stitched look-around image may be identified firstly, for example, based on image grayscale, edge detection or machine learning. Then, a parking space entrance line may be constructed based on the corner points of the parking space. Parking space separation lines respectively connected to two endpoints of the parking space entrance line may be determined based on the parking space entrance line and other corner points of the parking space. The stitched look-around image is cropped based on the parking space entrance line and the parking space separation lines to obtain the parking space sample image.

In implementation, a parking space sample image may indicate a parking space position by using the parking space entrance line and the two parking space separation lines connected to the parking space entrance line. The two parking space separation lines connected to the parking space entrance line may be perpendicular to the parking space entrance line, that is, the parking space corresponding to the parking space position is a horizontal parking space or a vertical parking space. Apparently, the two parking space separation lines connected to the parking space entrance line may intersect but not perpendicular to the parking space entrance line, that is, the parking space corresponding to the parking space position is an oblique parking space.

It should be noted that multiple candidate parking space images may be obtained by cropping the stitched look-around image. A parking space image, representing a real parking space, is a positive sample, and a parking space image, representing a non-real parking space, is a negative sample. The parking space detection model trained in the embodiments of the present disclosure determines whether a parking space image represents a real parking space, and outputs a direction angle of the parking space in a case that the parking space image represents a real parking space. Therefore, the positive sample further identifies a direction angle of the parking space. The direction angle of the parking space may be an angle between a central axis of a vehicle and the parking space entrance line an angle between a driving direction of a vehicle and the parking space entrance line, or the like. The above information is labeled in the stitched look-around image, and then is converted into the parking space image by means of coordinate conversion and the like.

In practice, in order to facilitate calculation and processing, the stitched look-around image may be cropped based on a midpoint of the parking space entrance line to obtain the parking space sample image, and a distance from the midpoint of the parking space entrance line to an edge in the parking space sample image is equal to a distance from the midpoint of the parking space entrance line to another edge in the parking space sample image where the two edges are parallel or coincident with the parking space separation lines, to avoid additional computation caused by offset compensation in subsequent image processing.

Figure 3:
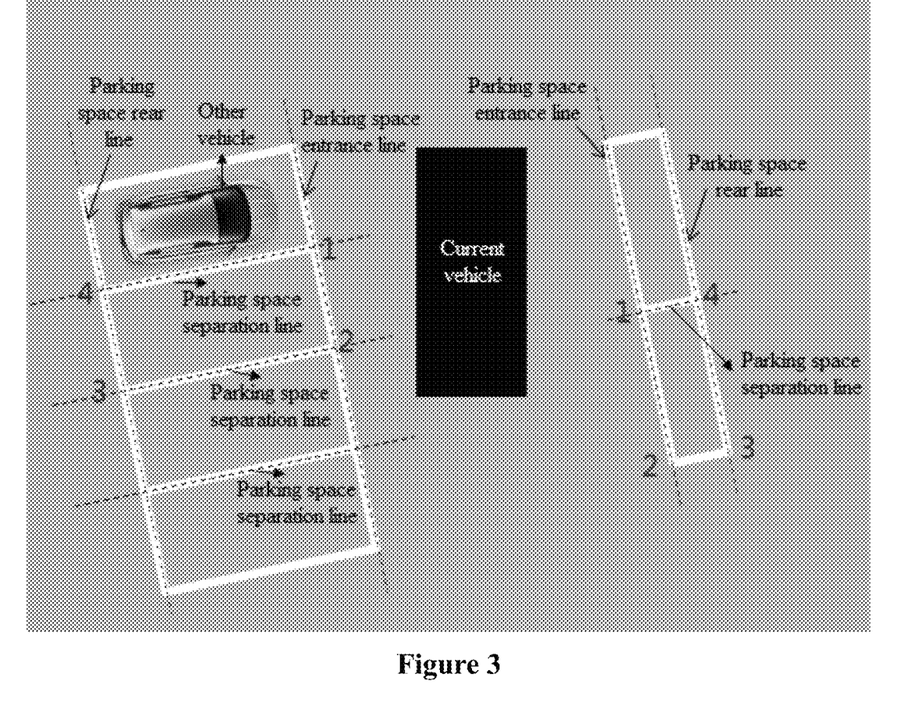
FIG. 3 is a schematic diagram of a training sample according to an embodiment of the present disclosure.

For ease of understanding, referring to a schematic diagram of a stitched look-around image shown in FIG. 3, a training sample may be obtained by labeling and cropping the stitched look-around image. For example, a parking space, corresponding to the left corner points 1, 2, 3 and 4 in the stitched look-around image may be labeled. Specifically, the parking space position is labeled by taking a line segment connecting the left corner points 1 and 2 as a parking space entrance line and taking a line segment connecting the left corner points 1 and 4 and a line segment connecting the left corner points 2 and 3 as parking space separation lines. In addition, it is labeled that the parking space label labels a real parking space, and a direction angle of the parking space is labeled. An image corresponding to the left corner points 1, 2, 3 and 4 is cropped from the stitched look-around image, and a positive sample is obtained. For another example, a parking space corresponding to the right corner points 1, 2, 3 and 4 in the stitched look-around image may be labeled. A line segment connecting corner points 1 and 2 is a parking space entrance line, and a line segment connecting corner points 1 and 4 and a line segment connecting corner points 2 and 3 are parking space separation lines. In addition, it is labeled that the parking space label labels a real parking space, and a direction angle of the parking space is labeled. An image corresponding to the right corner points 1, 2, 3 and 4 is cropped from the stitched look-around image, and another positive sample is obtained.

It should be noted that, since there are various types of real parking spaces, in a case that the parking space label indicates that the parking space position is a position of a real parking space, the type of the parking space may be identified. In an example, the parking space label may identify that the real parking space is a vertical parking space, a parallel parking space or an oblique parking space. As shown in FIG. 3, the parking space corresponding to the left corner points 1, 2, 3 and 4 in the stitched look-around image may be identified as a vertical parking space, and the parking space corresponding to the right corner points 1, 2, 3 and 4 in the stitched look-around image may be identified as a horizontal parking space.

That is, the parking space label may indicate whether the parking space sample image represents a real parking space. Thus, the model obtained based on the training sample is mainly used for predicting whether a candidate parking space image represents a real parking space. The model outputs $P_0$ representing a probability of a real parking place, and outputs $P_1$ representing a probability of a non-real parking place. Since there are different types of real parking spaces, the parking space label may further indicates that the parking space sample image represents a horizontal parking space, a vertical parking space, an oblique parking space or a non-real parking space. Thus, the model trained based on the training sample is mainly used for predicting whether the candidate parking space image represents a horizontal parking space, a vertical parking space, an oblique parking space or a non-real parking space. The model outputs $P_0$ representing a probability of a horizontal parking place, outputs $P_1$ representing a probability of a vertical parking space, outputs $P_2$ representing a probability of an oblique parking space, and outputs $P_3$ representing a probability of a non-real parking space.

In the example shown in FIG. 3, in a case that a line segment connecting the left corner points 1 and 3 in the parking space image is used as the parking space entrance line, two parking space separation lines respectively connected to two endpoints of the parking space entrance line are determined based on the parking space entrance line, the corresponding parking position is labeled as a non-real parking space, and then a negative sample is obtained.

In step S202, a parking space detection model is trained based on the training sample, and the training is stopped when a loss function of the parking space detection model meets a training end condition.

For the parking space detection model, a candidate parking space image representing a parking space position is used as an input, and a parking space detection result is outputted. The parking space detection result indicates whether the candidate parking space image represents a real parking space. In a case that the candidate parking space image represents a real parking space, the parking space detection result further includes a direction angle of the parking space.

In order to simultaneously perform the task of detecting a parking space and the task of detecting a direction angle of the parking space, loss functions corresponding to the two tasks are fused. The server may determine a loss function of the parking space detection model based on a classification loss and a regression loss. The classification loss represents a loss generated in predicting a real parking space, and the regression loss represents a loss generated in predicting the direction angle of the parking space.

In implementation, the server may perform weighted operation on the classification loss and regression loss to obtain the loss function of the parking space detection model. In a case that the classification result indicates that the candidate parking space image represents a non-real parking space, no regression loss is to be generated and a weight of the regression loss may be set to 0. In a case that the classification result indicates that the candidate parking space image represents a real parking space, it is required to perform regression analysis to generate the direction angle of the parking space. In this case, a regression loss is further generated, and a weight of the regression loss may be set according to actual requirements. For example, the weight of the regression loss may be set to 1. In the loss function of the parking space detection model, the classification loss may be expressed as a classification loss function such as softmax, and the regression loss may be expressed as a regression loss function L_regression, such as an absolute value loss L1 loss, a square loss L2 loss, or a smoothed mean absolute error loss Huber loss.

Specifically, the server trains the parking space detection model by using a joint training method, that is, a same loss function is used in detecting the parking space and in detecting the direction angle of the parking space. The loss function is expressed as the following equation:

$$\text{loss\_detect} = \alpha * L\_\text{softmax} + f(\cdot) * L\_\text{regression} \quad (1)$$

In the second part of the loss function in the above equation (1), $f(\cdot)$ has an outputs with a range of $\{0,1\}$. In a case that the classification result indicates a real parking space, $f(\cdot)=1$. In a case that the classification result indicates a non-real parking space, $f(\cdot)=0$.

Thus, with a training result based on a positive sample, the loss function is affected by the classification loss and regression loss, and reference may be made to equation 1. With a training result based on a negative sample, the loss function is affected by the classification loss, which may be expressed as:

$$\text{loss\_detect} = \alpha * L\_\text{softmax} \quad (2)$$

In practice, the parking space detection model may be a neural network model. For example, the parking space detection model may be a network model based on AlexNet, VGGNet, GoogleNet or MobileNet. Apparently, the parking space detection model may be a network with some network layer modifications based on the above networks.

It should be understood that the process of training the parking space detection model based on training samples is actually a process of iteratively updating parameters of the model based on the training samples. Thus, the loss function of the parking space detection model reflects a degree of a deviation between a predicted value and a real value. In a case that the loss function of the parking space detection model tends to converge, it indicates that a further optimization for a current parking space detection model is limited, it may be regarded that a training end condition is met, and the server stops training. Apparently, in some cases, when the loss function of the parking space detection model is less than a preset threshold, it may be regarded that a training end condition is met, and the server may stop training.

Therefore, a model training method is provided according to the embodiments of the present disclosure. With the method, the task of determining a parking space and the task of determining a direction angle of the parking space are fused into one network model for joint training. For a parking space sample image, a parking space position is labeled based on a parking space entrance line and two parking space separation lines respectively connected to two endpoints of the parking space entrance line. Whether the parking space sample image represents a real parking space is indicated by a parking space label. In a case that the parking space sample image represents a real parking space, a direction angle of the parking space is further labeled, to fuse training samples corresponding to the two tasks. Then, a parking space detection model is trained based on the fused training samples. Since two tasks are to be performed based on the parking space detection model, it is required to fuse the loss function of the parking space detection model. The loss function includes the classification loss and the regression loss. In a case that the parking space label indicates that the parking space position is not a real parking space, the weight of the regression loss is set to 0. Therefore, the two tasks are fused into one network model for model training, improving calculation performance and training efficiency, and achieving high availability.

Figure 4:
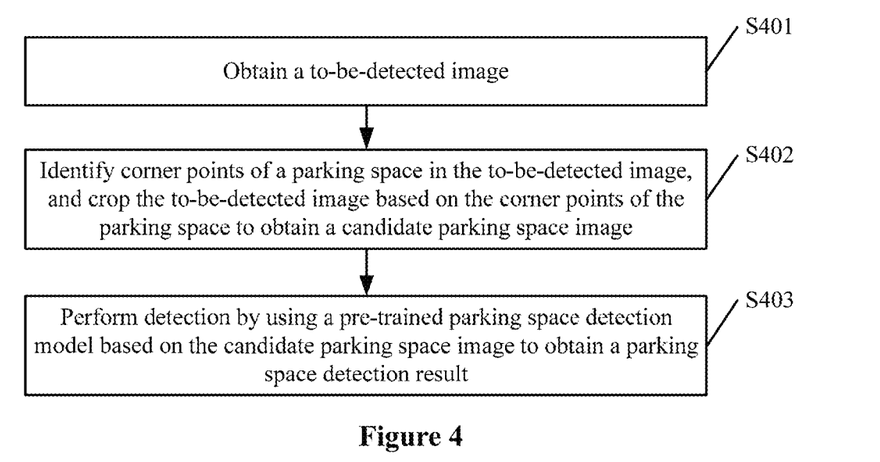
FIG. 4 is a flowchart of a method for detecting a parking place and a direction angle of the parking place according to an embodiment of the present disclosure.

Next, the method for detecting a parking place and a direction angle of the parking place according to the embodiments of the present disclosure is described from the perspective of the parking system. Reference is made to FIG. 4, which shows a flowchart of a method for detecting a parking place and a direction angle of the parking place. The method includes the following steps S401 to S403.

In step S401, a to-be-detected image is obtained.

After entering a parking lot or other places for parking, the vehicle may trigger a camera to perform camera operation by using a parking system. The parking system may stitch images of a parking space captured by multiple cameras arranged on the front, rear, left and right of the vehicle to obtain a stitched look-around image as the to-be-detected image.

In step S402, corner points of the parking space in the to-be-detected image are identified, and the to-be-detected image is cropped based on the corner points of the parking space to obtain a candidate parking space image.

In scenarios such as a parking lot, corner points of a parking space are generally represented by T-shaped marks or L-shaped marks. Thus, the parking system of the vehicle may extract features of corner points of a parking space based on machine learning and then identify corner points of a parking space in the to-be-detected image. Alternatively, the parking system of the vehicle may identify corner points of a parking space by means of edge detection, image grayscale, and the like.

After identifying the corner points of the parking space, the parking system may determines a parking space entrance line based on the corner points of the parking space, and then determines parking space separation lines based on the parking space entrance lines. Next, the to-be-detected image is cropped based on the parking space entrance line and the parking space separation lines to obtain a candidate parking space image.

Based on the determined parking space entrance line, a different candidate parking space image is obtained by cropping the to-be-detected image. Therefore, multiple candidate parking space images may be obtained by cropping one stitched look-around image.

In step S403, detection is performed by using a pre-trained parking space detection model based on the candidate parking space image to obtain a parking space detection result.

The parking space detection result indicates whether the candidate parking space image represents a real parking space. In a case that the candidate parking space image represents a real parking space, the parking space detection result further includes a direction angle of the parking space.

The parking space detection model is trained by using the model training method according to the embodiment shown in FIG. 2. Specifically, training is performed based on the training samples, and the training is stopped when the loss function of the parking space detection model meets the training end condition. The trained model with this method may be used as a parking space detection model for detecting a parking space by the parking system.

It should be understood that the parking space detection model includes a feature extraction layer, a classification layer and a regression layer. In detection, feature extraction is performed on the candidate parking space image by using the feature extraction layer to obtain an image feature corresponding to the candidate parking space image. Then, based on a hidden layer mapping relationship learned in training the model, classification is performed on the candidate parking space image by using the classification layer based on the image feature. In a case that a classification result indicates that the candidate parking space image represents a real parking space, regression analysis is performed by using the regression layer based on the image feature to obtain the direction angle of the parking space. In a case that a classification result indicates that the candidate parking space image represents a non-real parking space, the classification result is determined as a parking space detection result.

In implementation, the parking system may display the detection result on a display panel, and the user parks the vehicle based on the displayed detection results. It should be noted that the user may park the vehicle manually based on the detection result, or the parking system may transmit the detection result to a controller and then the controller controls the vehicle to park automatically.

Further, in a case that a parking space label of a training sample indicates that a real parking space is a vertical parking space, a horizontal parking space or an oblique parking space, the parking space detection result indicates that the parking space position is a vertical parking space, a horizontal parking space, an oblique parking space or a non-real parking space. Thus, the parking system may display a designated type of parking space in a highlight mode in displaying the parking space detection result on the display panel. The designated type of parking space may be any one of the vertical parking space, the horizontal parking space and the oblique parking space.

Figure 5:
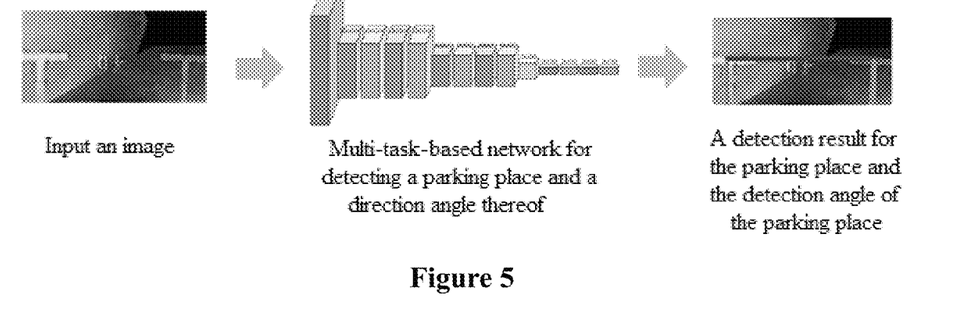
FIG. 5 is a schematic diagram of a method for detecting a parking place and a direction angle of the parking place according to an embodiment of the present disclosure.

FIG. 5 shows a schematic diagram of inputting a candidate parking space image to a parking space detection model to obtain a parking space detection result. As shown in FIG.

5, the inputted candidate parking space image includes T-shaped marks representing corner points of a parking space. The candidate parking space image includes a parking space entrance line determined based on the corner points of the parking space and parking space separation lines respectively connected to two endpoints of the parking space entrance line. In practice, the parking space entrance line and the parking space separation lines may be distinguished by different colors or linetypes. The parking space detection model may identify the candidate parking image to determine whether the parking space identified by the parking entrance line and the parking separation lines is a real parking space. In a case that the identified parking space is a real parking space, a direction angle of the parking space is further outputted.

Therefore, a method for detecting a parking place and a direction angle of the parking place is provided according to the embodiments of the present disclosure. With the method, parking space detection is performed by using a pre-trained parking space detection model. The detection of a parking space and the detection of a direction angle of the parking space are fused into one deep neural network, improving computational performance. In addition, the type of the parking space and the direction angle of the parking space are detected simultaneously, it is only required for the parking space classification network to determine whether the parking space is a real parking space without determining the type of the parking space. The type of the parking space is determined by the assistance of the direction angle of the parking space.

It should be noted that the embodiment shown in FIG. 4 is described by taking the parking system as an example. In other implementations, the parking system may transmit the to-be-detected image to a server, and then the server detects a parking space and a direction angle of the parking space.

Implementations of the model training method and the method for detecting a parking place and a direction angle of the parking place according to the embodiments of the present disclosure are described above. Based on the methods mentioned above, a model training apparatus and an apparatus for detecting a parking place are provided according to the embodiments of the present disclosure. Detailed descriptions are provided below from the perspective of functional modularization.

Figure 6:
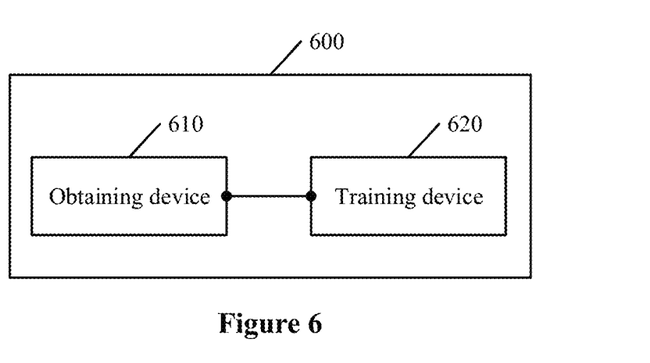
FIG. 6 is a schematic structural diagram of a model training apparatus according to an embodiment of the present disclosure.

Reference is made to FIG. 6, which shows a schematic structural diagram of a model training apparatus. The apparatus 600 includes an obtaining device 610 and a training device 620.

The obtaining device 610 is configured to obtain a training sample. The training sample includes a parking space sample image and labeling information of the parking space sample image. The labeling information includes a parking space position and a parking space label. The parking space label indicates whether the parking space sample image represents a real parking space and a direction angle of the real parking space.

The training device 620 is configured to train a parking space detection model based on the training sample, and stop training when a loss function of the parking space detection model meets a training end condition. For the parking space detection model, a candidate parking space image representing a parking space position is used as an input, and a parking space detection result is outputted. The parking space detection result indicates whether the candidate parking space image represents a real parking space. In a case that the candidate parking space image represents a real parking space, the parking space detection result further includes a direction angle of the parking space.

In an embodiment, the regression loss is determined by using any one of a square loss function, an absolute value loss function and a smoothed mean absolute error loss function.

In an embodiment, the parking space detection model is a network model based on AlexNet, VGGnet, GoogleNet or MobileNet.

Figure 7:
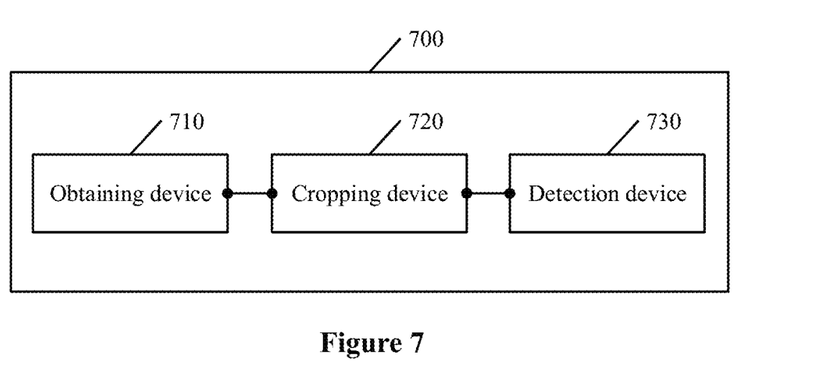
FIG. 7 is a schematic structural diagram of an apparatus for detecting a parking place and a direction angle of the parking place according to an embodiment of the present disclosure.

Next, reference is made to FIG. 7, which shows a schematic structural diagram of an apparatus for detecting a parking place and a direction angle of the parking place. The apparatus 700 includes an obtaining device 710, a cropping device 720 and a detection device 730.

The obtaining device 710 is configured to obtain a to-be-detected image. The cropping device 720 is configured to identify corner points of a parking space in the to-be-detected image and crop the to-be-detected image based on the corner points of the parking space to obtain a candidate parking space image. The detection device 730 is configured to perform detection by using a pre-trained parking space detection model based on the candidate parking space image to obtain a parking space detection result. The parking space detection result indicates whether the candidate parking space image represents a real parking space. In a case that the candidate parking space image represents a real parking space, the parking space detection result further includes a direction angle of the parking space.

In an embodiment, the parking space detection model includes a feature extraction layer, a classification layer and a regression layer.

The detection device 730 is configured to: performing feature extraction on the candidate parking space image by using the feature extraction layer to obtain an image feature corresponding to the candidate parking space image; performing classification on the candidate parking space image by using the classification layer based on the image feature; and perform, in a case that a classification result indicates that the candidate parking space image represents a real parking space, regression analysis by using the regression layer based on the image feature to obtain the direction angle of the parking space.

In an embodiment, a loss function of the parking space detection model is determined based on a classification loss and a regression loss. The classification loss represents a loss generated in predicting the real parking space, and the regression loss represents a loss generated in predicting the direction angle of the parking space.

In an embodiment, the loss function of the parking space detection model is a weighted sum of the classification loss and the regression loss. In a case that the classification result of the classification layer indicates that the candidate parking space image represents a non-real parking space, a weight of the regression loss is equal to 0.

In an embodiment, the parking space detection model is trained based on a training sample. The training sample includes a parking space sample image and labeling information of the parking space sample image. The labeling information includes a parking space position and a parking space label corresponding to the parking space sample image. The parking space label indicates whether the parking space sample image represents a real parking space and the direction angle of the real parking space.

In an embodiment, in a case that the parking space label indicates that the parking space sample image represents a real parking space, the parking space label indicates that the parking space sample image represents a vertical parking space, a horizontal parking space or an oblique parking space.

In an embodiment, the parking space position is indicated by a parking space entrance line and two parking space separation lines respectively connected to two endpoints of the parking space entrance line.

In an embodiment, a distance from the midpoint of the parking space entrance line to an edge in the parking space sample image is equal to a distance from the midpoint of the parking space entrance line to another edge in the parking space sample image, where the two edges are parallel or coincident with the parking space separation lines.

A device for performing the method for detecting a parking place and a direction angle of the parking place is further provided according to an embodiment of the present disclosure. The device may be a server, which is introduced below from the perspective of hardware materialization.

Figure 8:
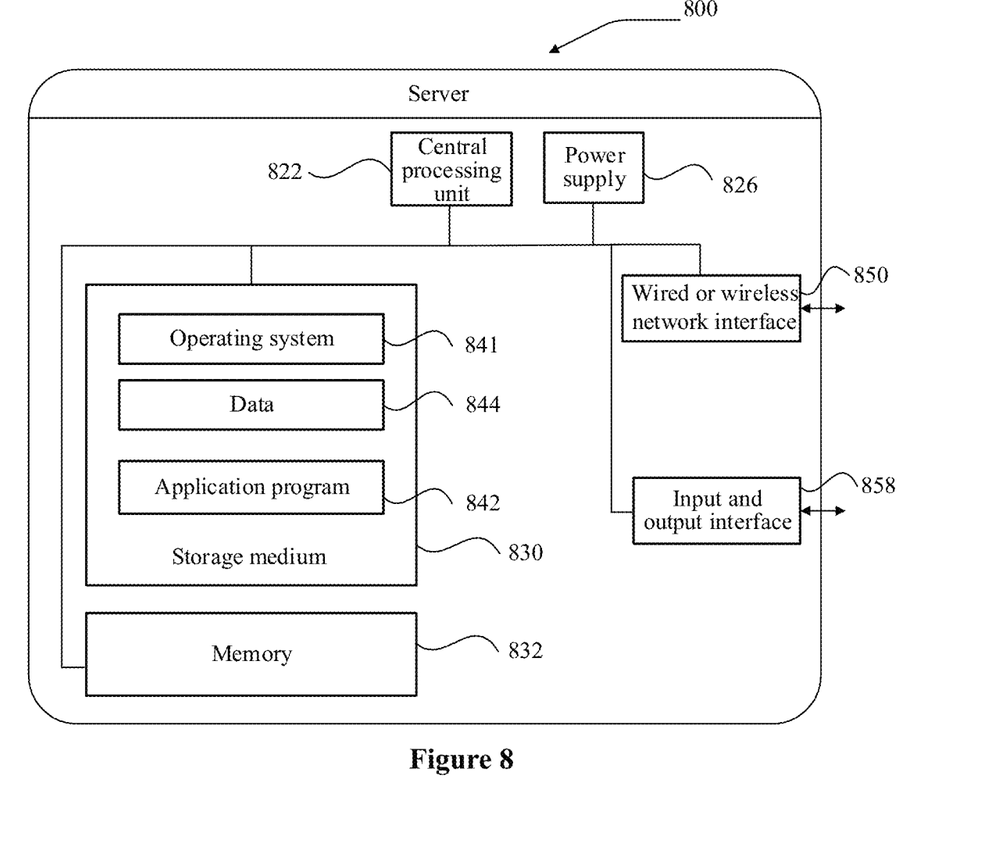
FIG. 8 is a schematic structural diagram of a server according to an embodiment of the present disclosure.

As shown in FIG. 8, the server 800 may vary greatly due to different configurations or performances. The server 800 may include one or more central processing units (CPUs) 822 (for example, one or more processors) and a memory 832, and one or more storage media 830 (for example, one or more mass storage devices) storing an application program 842 or data 844. The memory 832 and the storage medium 830 may perform temporary storage or persistent storage. The program stored in the storage medium 830 may include one or more devices (not shown in FIG. 8), and each of the devices may include a series of instruction operations in the server. Further, the central processor unit 822 may be configured to communicate with the storage medium 830 and perform, on the server 800, the series of instruction operations stored in the storage medium 830.

The server 800 may further include one or more power supplies 826, one or more wired or wireless network interfaces 850, one or more input and output interfaces 858, and/or one or more operating systems 841 such as Windows Server™, Mac OS X™, Unix™, Linux™, and FreeBSD™.

The steps performed by the server in the above embodiments may be based on the server structure shown in FIG. 8.

The CPU 822 is configured to: obtain a to-be-detected image; identify corner points of a parking space in the to-be-detected image and crop the to-be-detected image based on the corner points of the parking space to obtain a candidate parking space image; and perform detection by using a pre-trained parking space detection model based on the candidate parking space image to obtain a parking space detection result, where the parking space detection result indicates whether the candidate parking space image represents a real parking space, and in a case that the candidate parking space image represents the real parking space, the parking space detection result further includes a direction angle of the parking space.

In an embodiment, the CPU 822 is further configured to perform steps of the method for detecting a parking place and a direction angle of the parking place according to the embodiments of the present disclosure.

A device is further provided according to an embodiment of the present disclosure. The device includes a processor and a memory. The memory stores a computer program. The processor is configured to perform, when executing the computer program stored in the memory, the method for detecting a parking place and a direction angle of the parking place according to the present disclosure.

A vehicle is further provided according to an embodiment of the present disclosure. The vehicle includes a parking system and a controller. The parking system is configured to perform the method for detecting a parking place and a direction angle of the parking place to determine an available parking space. The available parking space is determined based on a candidate parking space image which represents a real parking space based on a parking space detection result. The controller is configured to control the vehicle to park on the available parking space.

A computer readable storage medium is further provided according to an embodiment of the present disclosure. The computer readable storage medium stores a computer program for performing the method for detecting a parking place and a direction angle of the parking place according the above embodiments.

A computer program product including instructions is further provided according to an embodiment of the present disclosure. The computer program product, when executed on a computer, causes the computer to perform the method for detecting a parking place and a direction angle of the parking place according the above embodiments.

For convenience and simplicity of description, for the working processes of the system, the apparatuses and the units described above, one may refer to corresponding processes in the above method embodiments, and the processes are not repeated herein.

In the embodiments of the present disclosure, it should be understood that the disclosed systems, apparatuses and methods may be implemented in other manners. For example, the apparatus embodiments described above are only schematic. For example, the units are divided only based on logical functions, and the units may be divided in other manners in actual implementations. For example, multiple units or components may be combined or integrated into another system, or some features may be ignored or not implemented. In addition, the shown or discussed mutual coupling, direct coupling or communication connection may be indirect coupling or communication connection through some interfaces, apparatuses or units, and may be electrical, mechanical or in other forms.

Units described as separate components may be or may not be physically separated. Components shown as units may be or may not be physical units, that is, may be arranged in one location or may be distributed in multiple network units. Parts or all of the units may be selected according to actual requirements to implement the embodiments of the present disclosure.

In addition, functional units in the embodiments of the present disclosure may be integrated in one processing unit, or exist separately. Alternatively, two or more units may be integrated in one unit. The integrated units may be implemented in a form of hardware or in a form of a software functional unit.

The integrated unit, if implemented in a form of a software functional unit and sold or used as an independent product, may be stored in a computer readable storage medium. Based on this understanding, the embodiments of the present disclosure or a part of the embodiments in the present disclosure contributing to the conventional technology, or all of or a part of the embodiments may be embodied in a form of a software product. The computer software product is stored in a storage medium, and includes several instructions causing a computer device (which may be a personal computer, a server, a network device or the like) to implement all or a part of steps of the methods described in the embodiments of the present disclosure. The storage medium described above includes various media storing program codes, such as a USB flash disk, a mobile hard disk, a read-only memory (ROM), a random access memory (RAM), a disk, or an optical disc.

The invention claimed is:

1. A method for detecting a parking place and a direction angle thereof, comprising:
   obtaining a to-be-detected image;
   identifying corner points of a parking space in the to-be-detected image, and cropping the to-be-detected image based on the corner points of the parking space to obtain a candidate parking space image;
   detecting the candidate parking space image by using a pre-trained parking space detection model to obtain a parking space detection result, wherein the parking space detection result indicates whether the candidate parking space image identifies a real parking space, and the parking space detection result further comprises a direction angle of the parking space in a case that the candidate parking space image identifies the real parking space; and
   parking a vehicle based on the parking space detection result.

2. The method according to claim 1, wherein
   the parking space detection model comprises a feature extraction layer, a classification layer and a regression layer; and
   the detecting the candidate parking space image by using a pre-trained parking space detection model comprises:
   performing feature extraction on the candidate parking space image by using the feature extraction layer to obtain an image feature corresponding to the candidate parking space image;
   performing classification on the candidate parking space image by using the classification layer based on the image feature; and
   performing, in a case that a classification result indicates that the candidate parking space image identifies the real parking space, regression analysis by using the regression layer based on the image feature to obtain the direction angle of the parking space.

3. The method according to claim 1, wherein
   a loss function of the parking space detection model is determined based on a classification loss and a regression loss, the classification loss represents a loss generated in predicting the real parking space, and the regression loss represents a loss generated in predicting the direction angle of the parking space.

4. The method according to claim 3, wherein
   the loss function of the parking space detection model is a weighted sum of the classification loss and the regression loss; and
   in a case that the classification result of the classification layer indicates that the candidate parking space image identifies a non-real parking space, a weight of the regression loss is equal to 0.

5. The method according to claim 1, wherein
   the parking space detection model is trained based on a training sample, the training sample comprises a parking space sample image and labeling information of the parking space sample image, the labeling information comprises a parking space position and a parking space label corresponding to the parking space sample image, and the parking space label indicates whether the parking space sample image identifies the real parking space and the direction angle of the real parking space.

6. The method according to claim 5, wherein in a case that the parking space label indicates that the parking space sample image identifies the real parking space, the parking space label indicates that the parking space sample image identifies a vertical parking space, a horizontal parking space or an oblique parking space.

7. The method according to claim 5, wherein the parking space position is indicated by a parking space entrance line and two parking space separation lines respectively connected to two endpoints of the parking space entrance line.

8. The method according to claim 7, wherein a distance from a midpoint of the parking space entrance line to an edge in the parking space sample image is equal to a distance from the midpoint of the parking space entrance line to another edge in the parking space sample image, wherein the two edges are parallel or coincident with the parking space separation lines.

9. A computer readable storage medium storing a computer program, wherein the computer program, when executed by a processor, causes the processor to:
   obtain a to-be-detected image;
   identify corner points of a parking space in the to-be-detected image, and crop the to-be-detected image based on the corner points of the parking space to obtain a candidate parking space image;
   detect the candidate parking space image by using a pre-trained parking space detection model to obtain a parking space detection result, wherein the parking space detection result indicates whether the candidate parking space image identifies a real parking space, and the parking space detection result further comprises a direction angle of the parking space in a case that the candidate parking space image identifies the real parking space; and
   parking a vehicle based on the parking space detection result.

10. A device, comprising:
    a memory, storing a computer program; and
    a processor, configured, when executing the computer program stored in the memory, to:
    obtain a to-be-detected image;
    identify corner points of a parking space in the to-be-detected image, and crop the to-be-detected image based on the corner points of the parking space to obtain a candidate parking space image;
    detect the candidate parking space image by using a pre-trained parking space detection model to obtain a parking space detection result, wherein the parking space detection result indicates whether the candidate parking space image identifies a real parking space, and the parking space detection result further comprises a direction angle of the parking space in a case that the candidate parking space image identifies the real parking space; and
    parking a vehicle based on the parking space detection result.

11. A vehicle, comprising:
    a parking system, and
    a controller; wherein
    the parking system is configured to:
    obtain a to-be-detected image;
    identify corner points of a parking space in the to-be-detected image, and crop the to-be-detected image based on the corner points of the parking space to obtain a candidate parking space image;
    detect the candidate parking space image by using a pre-trained parking space detection model to obtain a parking space detection result, wherein the parking space detection result indicates whether the candidate parking space image identifies a real parking space, and the parking space detection result further comprises a direction angle of the parking space in a case that the candidate parking space image identifies the real parking space; and determine an available parking space based on the parking space detection result; and the controller is configured to control the vehicle to park based on the available parking space.

\* \* \* \* \*